(12) United States Patent
Watanabe

(10) Patent No.: US 12,386,517 B2
(45) Date of Patent: Aug. 12, 2025

(54) CONTROL DEVICE, SYSTEM PROGRAM, AND METHOD

(71) Applicant: OMRON Corporation, Kyoto (JP)

(72) Inventor: Tadashi Watanabe, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/574,362

(22) PCT Filed: Mar. 25, 2022

(86) PCT No.: PCT/JP2022/014425
§ 371 (c)(1),
(2) Date: Dec. 27, 2023

(87) PCT Pub. No.: WO2023/276351
PCT Pub. Date: Jan. 5, 2023

(65) Prior Publication Data
US 2024/0319887 A1    Sep. 26, 2024

(30) Foreign Application Priority Data
Jul. 2, 2021    (JP) ................................. 2021-110651

(51) Int. Cl.
*G06F 3/06*    (2006.01)
(52) U.S. Cl.
CPC .......... *G06F 3/0617* (2013.01); *G06F 3/0653* (2013.01); *G06F 3/067* (2013.01)
(58) Field of Classification Search
CPC ...... G06F 3/0617; G06F 3/0653; G06F 3/067; G05B 19/05
See application file for complete search history.

(56) References Cited

U.S. PATENT DOCUMENTS

| 5,815,659 A * | 9/1998 | Umetsu ................ G05B 19/418 |
| | | 709/219 |
| 2007/0203676 A1* | 8/2007 | Jinzenji ................ G05B 19/058 |
| | | 702/189 |

(Continued)

FOREIGN PATENT DOCUMENTS

DE    112018000092 T5    10/2019
JP    2006-79480 A    3/2006
(Continued)

OTHER PUBLICATIONS

Prinsloo, Ignatius Michael. A comprehensive mobile data collection and management system for industrial applications. Diss. North-West University (South Africa), 2017. (Year: 2017).*

(Continued)

*Primary Examiner* — Nicholas J Simonetti
(74) *Attorney, Agent, or Firm* — Sughrue Mion, PLLC

(57) ABSTRACT

A control device includes a control operation performing unit that performs control operation on a control target in accordance with a user program, a data collector that collects one or more pieces of data designated in advance and has the data stored in a storage designated in advance, and a data manager that manages shared information that can be accessed by the control operation performing unit and the data collector. The data collector writes into the shared information, information indicating completion of storage of data in the storage. In the user program executed by the control operation performing unit, the shared information can be referred to.

20 Claims, 12 Drawing Sheets

(56) References Cited

U.S. PATENT DOCUMENTS

| | | | | |
|---|---|---|---|---|
| 2014/0337300 | A1* | 11/2014 | Vorne | G06F 16/21 |
| | | | | 707/700 |
| 2017/0099158 | A1* | 4/2017 | Mizutani | H04L 12/403 |
| 2019/0361712 | A1* | 11/2019 | Nasu | G06F 9/44505 |
| 2019/0377314 | A1 | 12/2019 | Annen | |
| 2024/0045614 | A1* | 2/2024 | Lee | G06F 3/0656 |

FOREIGN PATENT DOCUMENTS

| | | |
|---|---|---|
| JP | 2007-249937 A | 9/2007 |
| JP | 2016-110459 A | 6/2016 |
| JP | 2017-21498 A | 1/2017 |
| JP | 2020-149477 A | 9/2020 |
| JP | 2002333905 A | 11/2022 |
| KR | 10-2034087 B1 | 10/2019 |

OTHER PUBLICATIONS

Chen, Wei. "Intelligent manufacturing production line data monitoring system for industrial internet of things." Computer communications 151 (2020): 31-41. (Year: 2020).*

International Search Report for PCT/JP2022/014425 dated Jun. 14, 2022 (PCT/ISA/210).

Written Opinion for PCT/JP2022/014425 dated Jun. 14, 2022 (PCT/ISA/237).

Extended European Search Report issued Jun. 23, 2025 by the European Patent Office for EP Patent Application No. 22832512.2.

* cited by examiner

FIG. 6

| ITEM NAME | DATA TYPE | CONTENTS | |
|---|---|---|---|
| Heartbeat | DATE_AND_TIME | HEART BEAT | 1781 |
| ErrorCode | STRING[16] | ERROR CODE | 1782 |
| ErrorMessage | STRING[256] | ERROR MESSAGE | |
| ErrorDateTime | DATE_AND_TIME | TIME AND DAY OF OCCURRENCE OF ERROR | |
| WarnCode | STRING[16] | WARNING CODE | 1783 |
| WarnMessage | STRING[256] | WARNING MESSAGE | |
| WarnDateTime | DATE_AND_TIME | TIME AND DAY OF ISSUANCE OF WARNING | |
| StorageUsage | REAL | STORAGE USAGE RATE(%) | 1784 |
| StorageUsageWarning | BOOL | STORAGE USAGE RATE WARNING FLAG | |
| StorageUsageError | BOOL | STORAGE USAGE RATE ABNORMALITY FLAG | |
| OutputtedDateTime | DATE_AND_TIME | LAST OUTPUT TIME STAMP | 1785 |

| datetime | data1 | data2 | data3 | data4 | data5 | data6 |
|---|---|---|---|---|---|---|
| 2021/05/24 12:00:00.000 | 10 | 20 | 30 | 40 | 50 | aaa |
| 2021/05/24 12:00:00.001 | 11 | 20 | 30 | 40 | 50 | aaa |
| 2021/05/24 12:00:00.002 | 11 | 21 | 30 | 41 | 50 | aaa |
| 2021/05/24 12:00:00.003 | 12 | 21 | 31 | 40 | 50 | bbb |

FIG.11B

| datetime | ELAPSED TIME | CHANGE IN VARIABLE | STATE OF VARIABLE | VARIABLE VALUE STORAGE AREA | | | | | |
|---|---|---|---|---|---|---|---|---|---|
| | | | | 1 | 2 | 3 | 4 | 5 | 6 |
| 2021/05/24 12:00:00.000 | 0ms | | 111111 | 10 | 20 | 30 | 40 | 50 | aaa |
| --- | 1ms | 1 | 100000 | 11 | -- | -- | -- | -- | -- |
| --- | 1ms | 1 | 010100 | 21 | 41 | -- | -- | -- | -- |
| --- | 1ms | 1 | 101001 | 12 | 31 | bbb | -- | -- | -- |

| datetime | data1 | data2 | data3 | data4 | data5 | data6 |
|---|---|---|---|---|---|---|
| 2021/05/24 12:00:00.000 | 10 | 20 | 30 | 40 | 50 | aaa |
| 2021/05/24 12:00:00.001 | 10 | 20 | 30 | 40 | 50 | aaa |
| 2021/05/24 12:00:00.002 | 10 | 20 | 30 | 40 | 50 | aaa |
| 2021/05/24 12:00:00.003 | 10 | 20 | 30 | 40 | 50 | aaa |
| 2021/05/24 12:00:00.004 | 10 | 20 | 30 | 40 | 50 | aaa |
| 2021/05/24 12:00:00.005 | 10 | 20 | 30 | 40 | 50 | aaa |
| 2021/05/24 12:00:00.006 | 10 | 20 | 30 | 40 | 50 | aaa |
| 2021/05/24 12:00:00.007 | 10 | 20 | 30 | 40 | 50 | aaa |
| 2021/05/24 12:00:00.008 | 10 | 20 | 30 | 40 | 50 | aaa |

| datetime | ELAPSED TIME | CHANGE IN VARIABLE | THE NUMBER OF TIMES OF REPETITION | STATE OF VARIABLE | VARIABLE VALUE STORAGE AREA | | | | | |
|---|---|---|---|---|---|---|---|---|---|---|
| | | | | | 1 | 2 | 3 | 4 | 5 | 6 |
| 2021/05/24 12:00:00.000 | 0ms | 1 | — | 1 1 1 1 1 1 | 10 | 20 | 30 | 40 | 50 | aaa |
| — | 1ms | 0 | 8 | — | — | — | — | — | — | — |

191 · 192 · 193 · 196 · 194 · 195

CONTROL DEVICE, SYSTEM PROGRAM, AND METHOD

CROSS REFERENCE TO RELATED APPLICATIONS

This application is a National Stage of International Application No. PCT/JP2022/014425 filed Mar. 25, 2022, claiming priority based on Japanese Patent Application No. 2021-110651 filed Jul. 2, 2021, the contents of each of which being herein incorporated by reference in their entireties.

TECHNICAL FIELD

The present technology relates to a control device that controls a control target, a system program that implements the control device, and a method performed by the control device.

BACKGROUND ART

At various production sites, there are demands for improvement in availability of facilities by predictive maintenance. There are also demands for collection of a history (guaranteed traceability) of a process of manufacturing of all products.

In order to meet such demands, for example, a scheme for collection of data collected and managed by a control device such as a programmable logic controller (PLC) has been put into practical use. For example, Japanese Patent Laying-Open No. 2007-249937 (PTL 1) discloses a method of monitoring collected data, the method allowing free generation of a desired variable even after the PLC makes transition to an operating state. In this monitoring method, the collected data is stored in a CSV file format.

With rapid progress of the information communication technology in recent years, more data is collected in shorter cycles. In addition, a scheme for collection not only of data collected and managed by the PLC but also of image data (still images and moving images) together has been proposed.

CITATION LIST

Patent Literature

PTL 1: Japanese Patent Laying-Open No. 2007-249937

SUMMARY OF INVENTION

Technical Problem

As described above, importance of data collection at production sites has become greater. Therefore, any trouble in data collection may have influence such as failure in shipment of produced products themselves.

The present technology provides solving means for more reliable collection of data by a control system including a control device.

Solution to Problem

A control device according to an example of the present technology includes a control operation performing unit configured to perform control operation on a control target in accordance with a user program, a data collector configured to collect one or more pieces of data designated in advance and have the data stored in a storage designated in advance, and a data manager configured to manage shared information that can be accessed by the control operation performing unit and the data collector. The data collector is configured to write into the shared information, information indicating completion of storage of data in the storage. In the user program executed by the control operation performing unit, the shared information can be referred to. According to this configuration, the information indicating completion of storage of data in the storage can be referred to in the user program executed by the control operation performing unit. Therefore, such control as start of next processing on condition that storage of data in the storage has been completed can be implemented. The data can thus more reliably be collected.

The information indicating completion of storage of the data in the storage may include information indicating time and day of completion of storage of the data in the storage. According to this configuration, whether or not storage of data in the storage has been completed can be determined by monitoring of time and day included in the shared information.

The control operation performing unit may set a collection trigger to ON when a condition designated in advance is satisfied, and the data collector may start data collection when the collection trigger is set to ON. According to this configuration, timing of start of data collection by the data collector can be controlled by appropriate control of ON/OFF of the collection trigger by the control operation performing unit.

The storage may be connected to the control device over a network. According to this configuration, even in the case of a storage connected over the network, data transmission to which cannot immediately be completed, completion of storage of data in the storage can be checked and monitored by utilization of the scheme described above.

The data collector may write into the shared information, information indicating whether or not data can be stored in the storage. According to this configuration, before start of storage of data in the storage, determination as to readiness for start of processing for data storage can be made.

The shared information may include information on a usage rate of the storage. According to this configuration, before start of storage of data in the storage, determination as to readiness for start of processing for data storage can be made.

The data collector may cause information on a part of presently collected data to be stored in the storage, the part of the presently collected data being a part that has changed from data collected immediately before. According to this configuration, a capacity of data stored in the storage can be reduced.

When collected data is identical in a plurality of times of data collection, the data collector may cause contents of identical data and the number of times of repeated collection of the identical data to be stored in the storage. According to this configuration, necessary information also on a control target, data of which does not change, can be collected without the capacity of the storage being strained.

A system program according to another example of the present technology causes a computer to perform performing control operation on a control target in accordance with a user program, collecting one or more pieces of data designated in advance and storing the data in a storage designated in advance, and writing into shared information, information indicating completion of storage of data in the storage. In the user program, the shared information can be referred to.

According to yet another example of the present technology, a method performed by a control device is provided. The method includes performing control operation on a control target in accordance with a user program, collecting one or more pieces of data designated in advance and storing the data in a storage designated in advance, and writing into shared information, information indicating completion of storage of data in the storage. In the user program, the shared information can be referred to.

Advantageous Effects of Invention

According to the present technology, solving means for more reliable collection of data by a control system including a control device can be provided.

BRIEF DESCRIPTION OF DRAWINGS

FIG. 6 is a schematic diagram showing an exemplary data structure of status monitoring data managed by the control system according to the present embodiment.

FIGS. 11A and 11B are diagrams each showing an example of data compression by the control system according to the present embodiment.

FIGS. 12A and 12B are diagrams each showing another example of data compression by the control system according to the present embodiment.

DESCRIPTION OF EMBODIMENTS

Figure 1:
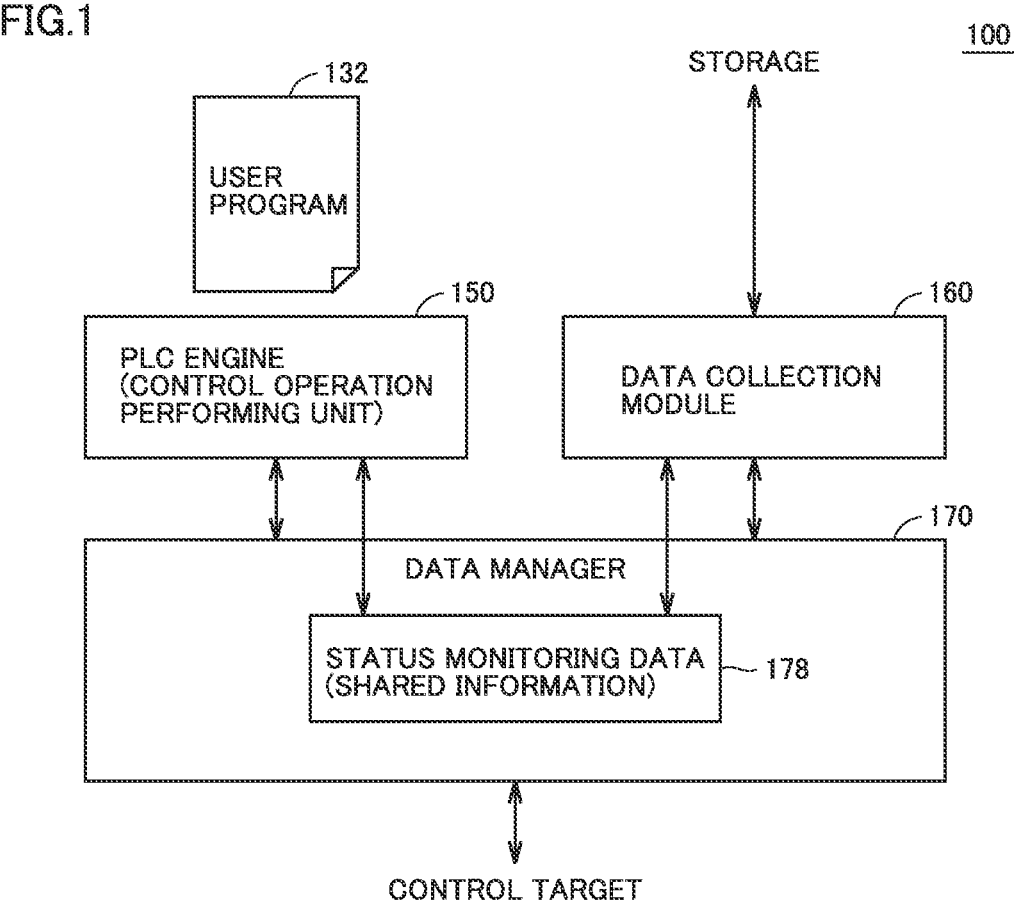
FIG. 1 is a schematic diagram showing a main configuration of a control device of a control system according to the present embodiment.

An embodiment of the present invention will be described in detail with reference to the drawings. The same or corresponding elements in the drawings have the same reference characters allotted and description thereof will not be repeated.

<A. Exemplary Application>

An exemplary scene to which the present invention is applied will initially be described.

FIG. 1 is a schematic diagram showing a main configuration of a control device 100 of a control system 1 according to the present embodiment. Control device 100 is a computer that controls a control target, and typically implemented by a programmable logic controller (PLC).

Referring to FIG. 1, control device 100 includes, as its functional configuration, a PLC engine 150, a data collection module 160, and a data manager 170.

PLC engine 150 corresponds to a control operation performing unit that performs control operation on a control target in accordance with a user program 132.

Any object that directly or indirectly relates to control operation performed by the control device is herein referred to as a "control target." The term "control target" is not limited to a machine alone or an apparatus alone to which the control device gives a command and a machine alone or an apparatus alone from which the control device collects information but may encompass a facility or a unit of a larger scale including such a machine or an apparatus.

Data collection module 160 corresponds to the data collector. Data collection module 160 collects one or more pieces of data designated in advance and has the data stored in a storage designated in advance.

Data manager 170 manages shared information that can be accessed by PLC engine 150 and data collection module 160. Status monitoring data 178 as exemplary shared information will be described below.

Data collection module 160 writes into the shared information, information indicating completion of storage of data in the storage. In user program 132 executed by PLC engine 150, the shared information can be referred to. In other words, by inclusion of an instruction contingent on the shared information in user program 132, such control operation that prescribed processing is not started until completion of storage of data in the storage can be implemented.

By thus sharing the shared information between PLC engine 150 and data collection module 160, data can more reliably be collected.

<B. Exemplary Overall Configuration>

Figure 2:
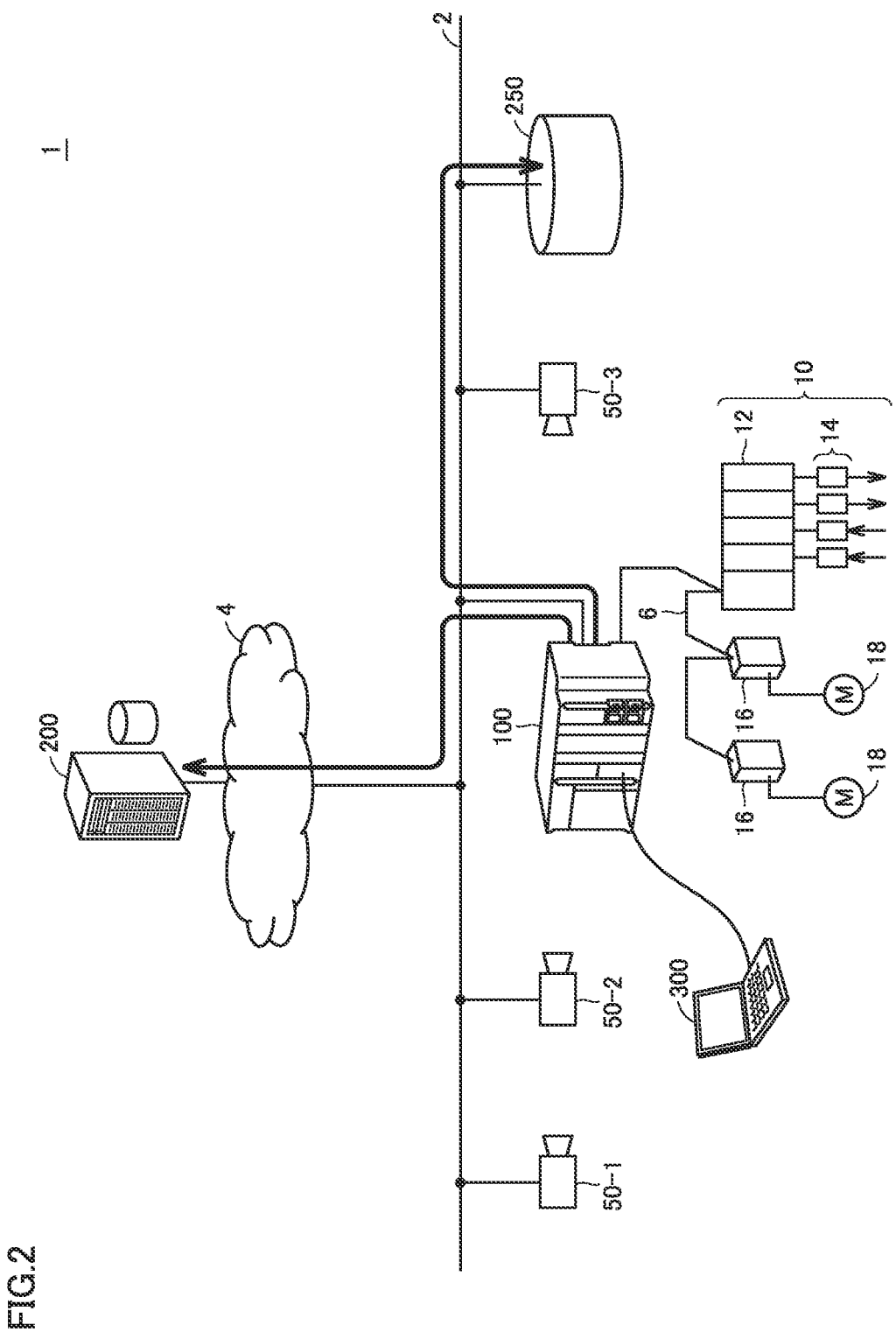
FIG. 2 is a schematic diagram showing an exemplary overall configuration of the control system according to the present embodiment.

FIG. 2 is a schematic diagram showing an exemplary overall configuration of control system 1 according to the present embodiment. Referring to FIG. 2, control system 1 according to the present embodiment includes, as its main components, control device 100 that controls a control target, a server apparatus 200, and a network storage 250. These components are connected over a local network 2 and a global network 4. One or more network cameras 50-1, 50-2, and 50-3 (which are also collectively referred to as a "network camera 50" below) are connected to local network 2. A support apparatus 300 which is an exemplary information processing apparatus may be connected to control device 100.

Control device 100 may be embodied as a kind of a computer such as a programmable logic controller (PLC). Control device 100 is connected to a field apparatus group 10 over a field network 6. Field network 6 preferably adopts an industrial communication protocol. EtherCAT®, EtherNet/IP®, DeviceNet®, CompoNet®, and the like have been known as such a communication protocol.

Field apparatus group 10 includes an apparatus that collects input data from a manufacturing apparatus and a production line (which are also collectively referred to as a "field" below) relating to a control target or control. An input relay and various sensors are assumed as such an apparatus that collects input data. Field apparatus group 10 further includes an apparatus that exerts some action onto a field based on a command generated by control device 100 (which is also referred to as "output data" below). An output relay, a contactor, a servo driver and a servo motor, and any other actuator are assumed as such an apparatus that exerts some action onto the field. Field apparatus group 10 exchanges data including the input data and the output data with control device 100 over field network 6.

In the exemplary configuration shown in FIG. 2, field apparatus group 10 includes a remote input/output (I/O) apparatus 12, a relay group 14, a servo driver 16, and a servo motor 18.

Remote I/O apparatus 12 includes a communication unit that communicates through field network 6 and an input and output unit (which is also referred to as an "I/O unit" below) that collects input data and provides output data. The input data and the output data are exchanged between control device 100 and the field through such an I/O unit. FIG. 2 shows an example in which a digital signal is exchanged as the input data and the output data through relay group 14. The I/O unit may directly be connected to field network 6.

Servo driver 16 drives servo motor 18 in accordance with the output data (for example, a position command or the like) from control device 100.

As described above, the input data and the output data are exchanged between control device 100 and field apparatus group 10 over field network 6. Such exchanged data is normally updated in very short cycles from the order of several hundred microseconds to the order of several ten milliseconds.

Control device 100 transmits to server apparatus 200 and/or network storage 250, data (input data and/or output data) exchanged with field apparatus group 10 and data (internal data and/or working data) referred to or updated in computing processing in control device 100.

The storage at a transmission destination or a storage destination may thus be connected to control device 100 over the network.

Network camera 50 transmits an image (still images or moving images) picked up at any timing to server apparatus 200 and/or network storage 250.

Server apparatus 200 includes a storage for storage of data and stores the data in response to a request from control device 100 and/or network camera 50. Data is stored similarly also in network storage 250, in response to a request from control device 100 and/or network camera 50. Both of server apparatus 200 and network storage 250 do not have to be provided, and only one of them may be provided. Alternatively, a plurality of server apparatuses 200 or network storages 250 may be provided.

Support apparatus 300 is an information processing apparatus (an exemplary computer) that supports preparation necessary for control of a control target by control device 100. Specifically, support apparatus 300 provides a development environment (a program creation and edition tool, a parser, a compiler, and the like) for a user program to be executed by control device 100, a setting environment for setting of a parameter (configuration) of control device 100 and various devices connected to control device 100, a function to transmit the generated user program to control device 100, and a function to correct or modify on-line, the user program or the like to be executed on control device 100.

<C. Exemplary Hardware Configuration>

An exemplary hardware configuration of a main apparatus of control system 1 according to the present embodiment will now be described.

(c1: Exemplary Hardware Configuration of Control Device 100)

Figure 3:
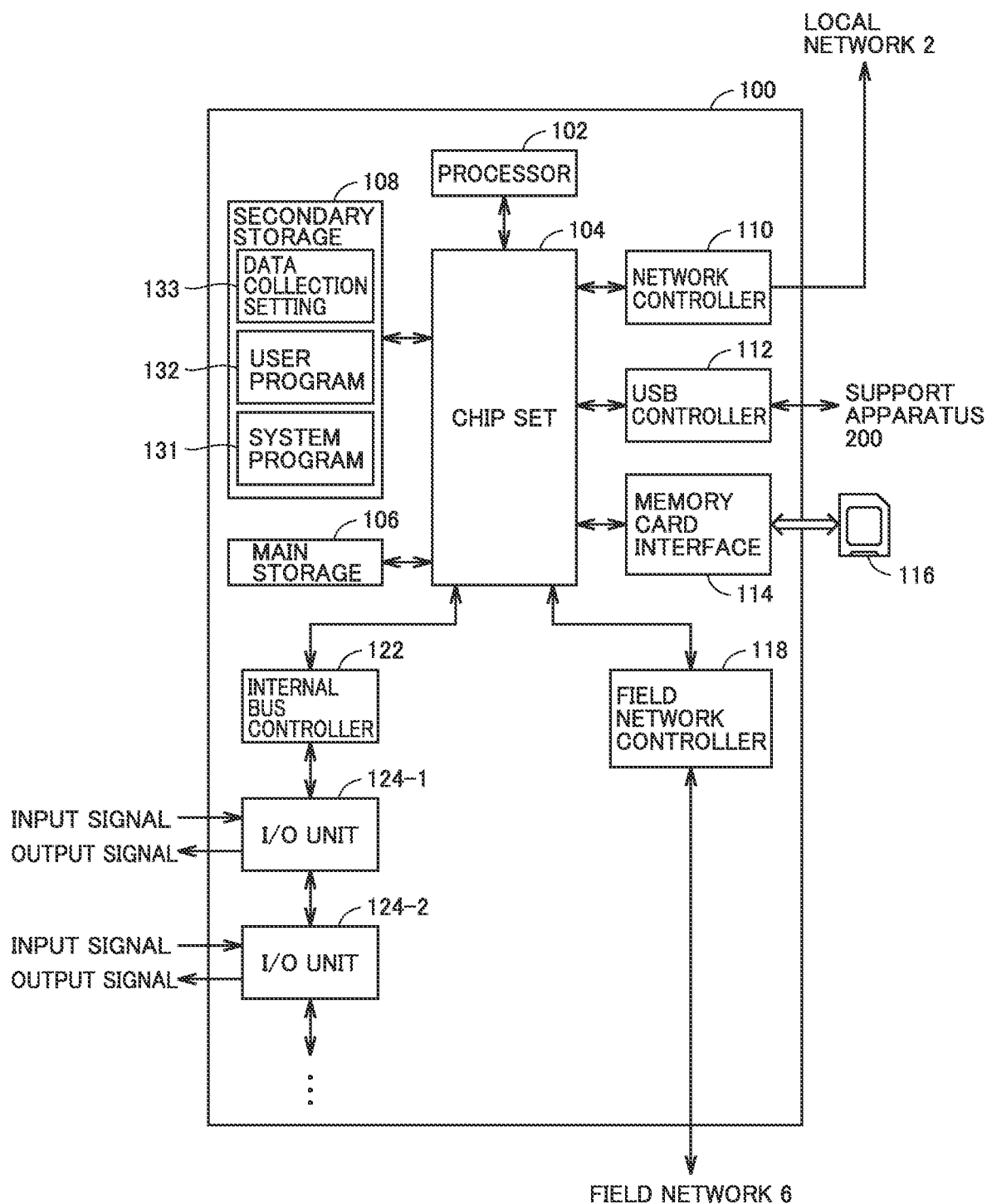
FIG. 3 is a block diagram showing an exemplary hardware configuration of the control device of the control system according to the present embodiment.

FIG. 3 is a block diagram showing an exemplary hardware configuration of control device 100 of control system 1 according to the present embodiment. Referring to FIG. 3, control device 100 includes a processor 102 such as a central processing unit (CPU) or a micro-processing unit (MPU), a chip set 104, a main storage 106, a secondary storage 108, a network controller 110, a universal serial bus (USB) controller 112, a memory card interface 114, an internal bus controller 122, a field network controller 118, and I/O units 124-1, 124-2, . . . .

Processor 102 reads various programs stored in secondary storage 108, develops the programs on main storage 106, and executes the programs, to thereby implement processing and functions as will be described later. Chip set 104 controls data transmission or the like between processor 102 and each component.

In addition to a system program 131, user program 132 that describes control operation, and data collection setting 133 that defines an object from which data is to be collected or a cycle of data collection are stored in secondary storage 108.

Network controller 110 controls exchange of data with another apparatus over local network 2. USB controller 112 controls exchange of data with support apparatus 300 through USB connection.

Memory card interface 114 is constructed such that a memory card 116 can be attached thereto and detached therefrom, and allows writing of data into memory card 116 and reading of various types of data (user program 132 or trace data) from memory card 116.

Internal bus controller 122 is an interface for exchange of data with I/O units 124-1, 124-2, . . . mounted on control device 100.

Field network controller 118 controls exchange of data with another apparatus over field network 6.

Though FIG. 3 shows an exemplary configuration in which a necessary function is provided by execution of a program by processor 102, a part or the entirety of these provided functions may be performed by using dedicated hardware circuitry (for example, an application specific integrated circuit (ASIC) or a field-programmable gate array (FPGA)). Alternatively, a principal part of control device 100 may be implemented by hardware (for example, an industrial personal computer based on a general-purpose personal computer) in accordance with a general-purpose architecture. In this case, using virtualization technology, a plurality of operating systems (OSs) different in application are executed in parallel and a necessary application may be executed on each OS.

(c2: Exemplary Hardware Configuration of Server Apparatus 200)

Server apparatus 200 according to the present embodiment is implemented by hardware (for example, a general-purpose personal computer) in accordance with a general-purpose architecture by way of example. Since the hardware in accordance with the general-purpose architecture has been known, detailed description will not be given.

(c3: Exemplary Hardware Configuration of Network Storage 250)

Network storage 250 according to the present embodiment is implemented by hardware (for example, a general-purpose personal computer) in accordance with a general-purpose architecture by way of example. A configuration with hardware resources less than in server apparatus 200 may be adopted. Since the hardware in accordance with the general-purpose architecture has been known, detailed description will not be given.

(c4: Exemplary Hardware Configuration of Support Apparatus 300)

Support apparatus 300 according to the present embodiment is implemented by execution of a program with the use of hardware (for example, a general-purpose personal computer) in accordance with a general-purpose architecture by way of example. Since the hardware in accordance with the general-purpose architecture has been known, detailed description will not be given.

<D. Data Collection>

A function and processing for data collection provided by control system 1 according to the present embodiment will now be described.

Figure 4:
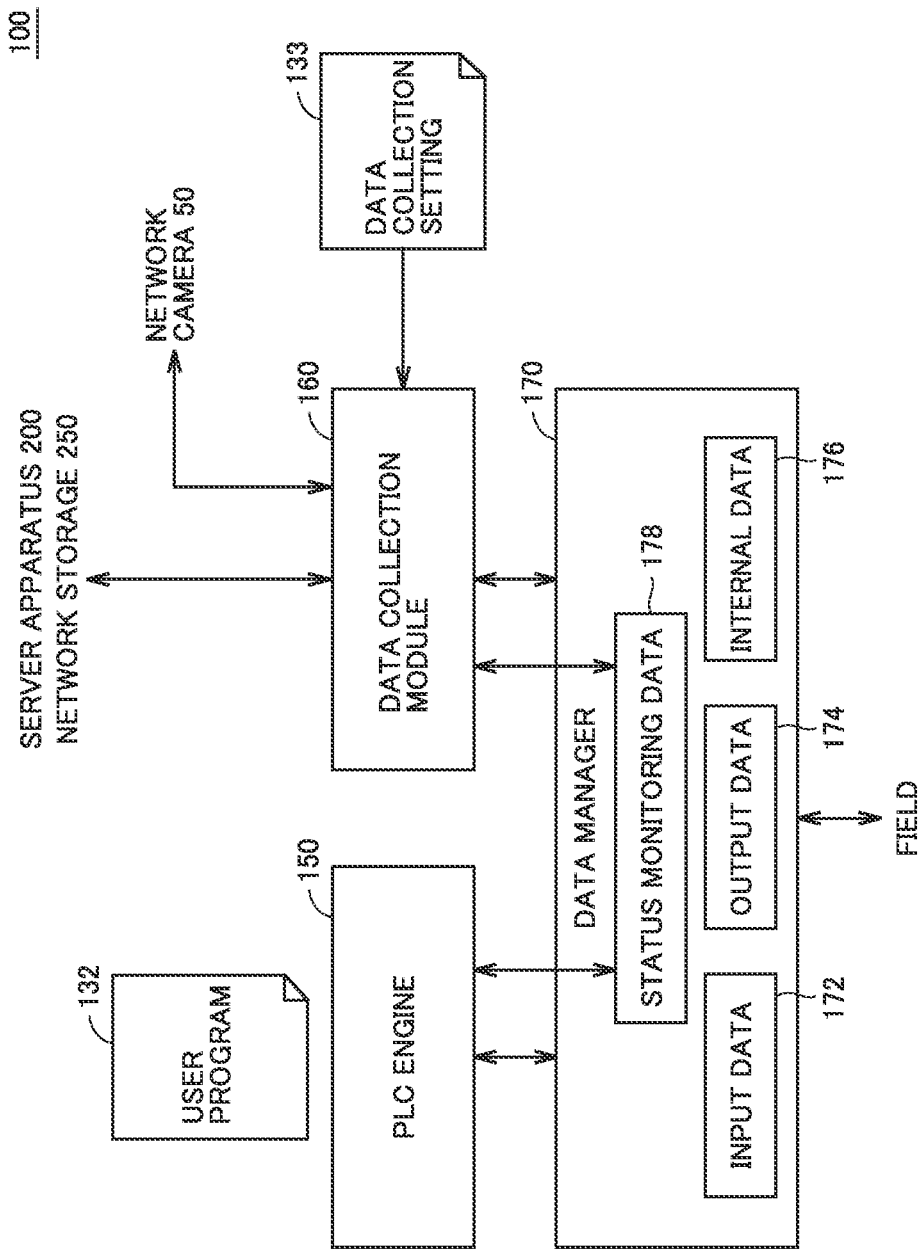
FIG. 4 is a schematic diagram showing an exemplary functional configuration for implementing data collection provided by the control system according to the present embodiment.

FIG. 4 is a schematic diagram showing an exemplary functional configuration for implementing data collection provided by control system 1 according to the present embodiment.

Referring to FIG. 4, control device 100 includes, as its functional configuration, PLC engine 150, data collection module 160, and data manager 170.

Data manager 170 holds input data 172 collected from a field, output data 174 which is a command outputted to the field, and internal data 176 referred to and updated in control operation performed by PLC engine 150 in accordance with user program 132. Data manager 170 updates input data 172, output data 174, and internal data 176 every predetermined cycle (I/O refreshing processing).

PLC engine 150 is a programmable execution entity that performs control operation on a control target in accordance with user program 132. More specifically, PLC engine 150 performs control operation described in user program 132 by referring to input data 172 and internal data 176 managed by data manager 170 and outputs to output data 174, a result of operation calculated by performing the control operation. When the control operation is performed, internal data 176 is referred to and updated.

Data collection module 160 performs processing involved with data collection. Specifically, data collection module 160 collects one or more pieces of data designated in advance and has the data stored in a storage designated in advance. More specifically, data collection module 160 collects in designated cycles, designated one or more pieces of data among input data 172, output data 174, and internal data 176 in accordance with data collection setting 133. Data collection module 160 then transmits the collected data to a designated storage destination (for example, server apparatus 200 and/or network storage 250).

A condition to start and quit data collection may also be designated in data collection setting 133. In this case, data collection module 160 determines whether or not one or more designated conditions are satisfied based on data collection setting 133. Typically, when the condition to start data collection is satisfied, data collection module 160 starts data collection, and when the condition to quit data collection is satisfied, data collection module 160 quits data collection. These conditions can be set based on any data managed by data manager 170.

Data collection module 160 can also transmit an instruction for image pick-up (image pick-up trigger) to designated network camera 50 in accordance with data collection setting 133. Though network camera 50 may successively pick up images, it may pick up images in response to the image pick-up trigger from control device 100 (data collection module 160). When moving images are to be picked up, an image pick-up start trigger and an image pick-up end trigger may be transmitted to network camera 50.

Network camera 50 transmits image data generated as a result of image pick-up to a designated storage destination (for example, server apparatus 200 and/or network storage 250).

In control system 1 according to the present embodiment, a status about data collection is shared between PLC engine 150 and data collection module 160. More specifically, PLC engine 150 and data collection module 160 share status monitoring data 178. In other words, data manager 170 manages status monitoring data 178 (shared information) that can be accessed by PLC engine 150 and data collection module 160. In the exemplary functional configuration shown in FIG. 4, data manager 170 manages status monitoring data 178, however, status monitoring data 178 may be managed by any entity independent of data manager 170.

Control system 1 according to the present embodiment can perform processing while it monitors that processing involved with data collection is appropriately performed, with the use of status monitoring data 178.

<E. Status Monitoring Data>

A data structure of status monitoring data 178 and processing with the use of status monitoring data 178 will now be described.

Figure 5:
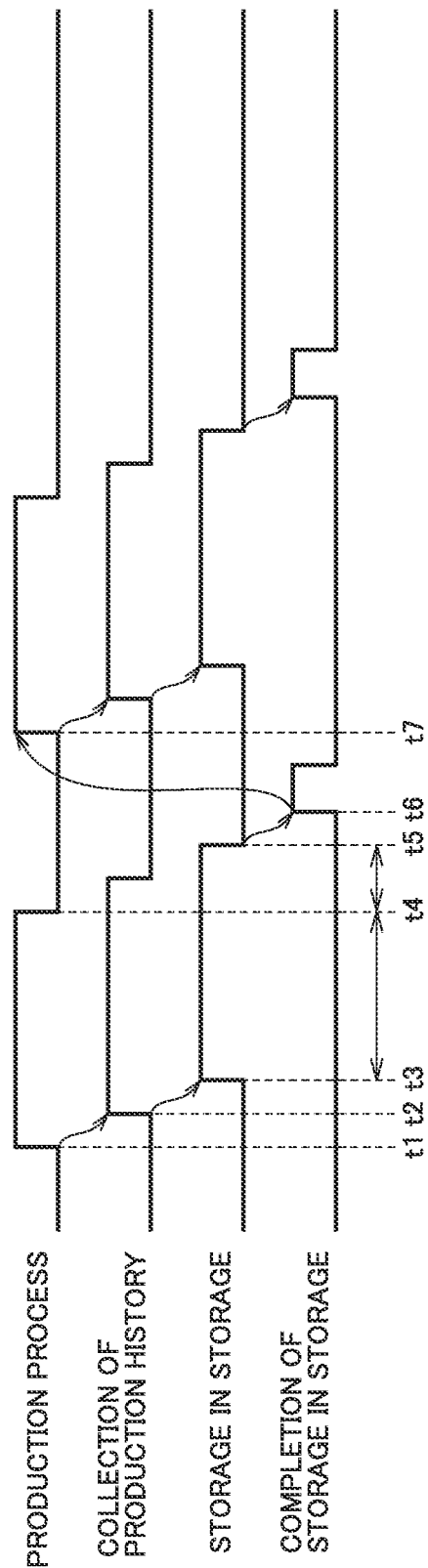
FIG. 5 is a time chart showing exemplary processing for data collection in the control system according to the present embodiment.

FIG. 5 is a time chart showing exemplary processing for data collection in control system 1 according to the present embodiment. Referring to FIG. 5, for example, processing involved with production is performed for each workpiece (production process).

When control device 100 starts the processing involved with production in the production process (time t1), it starts collection of a production history (time t2). In succession, control device 100 (and network camera 50) starts storage of the collected production history (collected data) in the storage (time t3).

It is assumed that the processing involved with production ends at time t4. Collection of the production history also ends with the processing involved with production. Finally, it is assumed that storage of the collected production history (collected data) in the storage is completed at time t5.

Control device 100 (control operation in accordance with user program 132) confirms completion of storage of the collected production history (collected data) in the storage (time t7), and then starts the processing involved with production in a next production process (time t7).

Thus, in control system 1 according to the present embodiment, control device 100 can confirm completion of storage of the collected data in the storage, and control start or the like of the processing in the production process on condition that storage in the storage is completed as such. For example, when the collected data cannot be stored in the storage for some reason, production or the like of a next workpiece can also be withheld. By adopting such control, such a situation as failure in storage of the production history of produced workpieces, that is, failure in guaranteeing traceability, can be avoided.

By thus starting a next cycle after completion of the cycle of the production process and after completion of storage of the production history, highly reliable data collection can be achieved.

As shown in FIG. 5, influence on a tact time can be minimized by collecting data on the production history in parallel to the production process. Influence on the tact time can be minimized also by increase in speed and capacity in collection of data on the production history.

Completion of storage in the storage shown in FIG. 5 can be detected, for example, by update of a last output time stamp (see FIG. 6) as will be described next. Specifically, timing of start of the production process or the like can appropriately be controlled in control operation in accordance with user program 132 executed by control device 100 with the use of status monitoring data 178.

FIG. 6 is a schematic diagram showing an exemplary data structure of status monitoring data 178 managed by control system 1 according to the present embodiment. Referring to FIG. 6, status monitoring data 178 includes a heart beat 1781, error information 1782, warning information 1783, storage usage rate information 1784, and a last output time stamp 1785.

In heart beat 1781, a time stamp is stored which indicates time and day of determination that collected data can normally be stored, which is made in response to an inquiry as to whether or not collected data can normally be stored. In other words, data collection module 160 writes into status monitoring data 178 (shared information), heart beat 1781 which is information indicating whether or not data can be stored in the storage.

When data can normally be collected, a value of the time stamp is updated every prescribed cycle. When data cannot normally be collected, on the other hand, the time stamp of heart beat 1781 is not updated and a value indicating old time and day is maintained as it is. The cycle of update of the time stamp in heart beat 1781 may be defined in data collection setting 133.

Information on an error in connection with the storage that has occurred latest is stored in error information 1782. In an example shown in FIG. 6, an error code indicating a type of the error that has occurred, an error message indicating contents of the error that has occurred, and time and day of occurrence of the error are stored in error information 1782.

Information on a warning (an abnormal state before it leads to the error) in connection with the storage that has been issued latest is stored in warning information 1783. In the example shown in FIG. 6, a warning code indicating a type of the warning that has been issued, a warning message indicating contents of the warning that has been issued, and time and day of issuance of the warning are stored in warning information 1783.

Information on a usage rate of the storage which is the storage destination is stored in storage usage rate information 1784. In the example shown in FIG. 6, a usage rate (numerical value) of the storage which is the storage destination, whether or not the usage rate of the storage has exceeded a prescribed warning threshold value (warning flag), and whether or not the usage rate of the storage has exceeded a prescribed abnormality threshold value (abnormality flag) are stored in storage usage rate information 1784.

A time stamp of latest processing in processing for output of collected data (processing for storage in the storage) is stored in last output time stamp 1785. Therefore, while the collected data is being stored in the storage, the time stamp stored in last output time stamp 1785 is sequentially updated. When storage of the collected data in the storage is completed, on the other hand, the time stamp stored in last output time stamp 1785 does not change.

For example, when completion of storage of collected data over a certain period is to be checked, a difference between the time stamp at the timing of buffering of collected data before transmission thereof and the time stamp stored in last output time stamp 1785 (completion of storage in the storage) should only be evaluated.

Status monitoring data 178 shown in FIG. 6 is updated (written) by data collection module 160 (FIG. 4) of control device 100 and referred to by PLC engine 150 (FIG. 4) of control device 100.

Data collection module 160 thus writes into status monitoring data 178 (shared information), information indicating completion of storage of data in the storage. In user program 132 executed in PLC engine 150, status monitoring data 178 (shared information) can be referred to.

In the exemplary data structure shown in FIG. 6, information (last output time stamp 1785) indicating time and day of completion of storage of data in the storage is used as the information indicating completion of storage of data in the storage. The information indicating time and day of completion of storage of data in the storage, however, is not limited to the time stamp, and a counter incremented/decremented each time of completion of storage or a state value may be applicable.

When a condition for data collection designated in advance is satisfied, PLC engine 150 sets a collection trigger to ON. When the collection trigger is set to ON, data collection module 160 starts collection of data and storage of the collected data.

Figure 7:
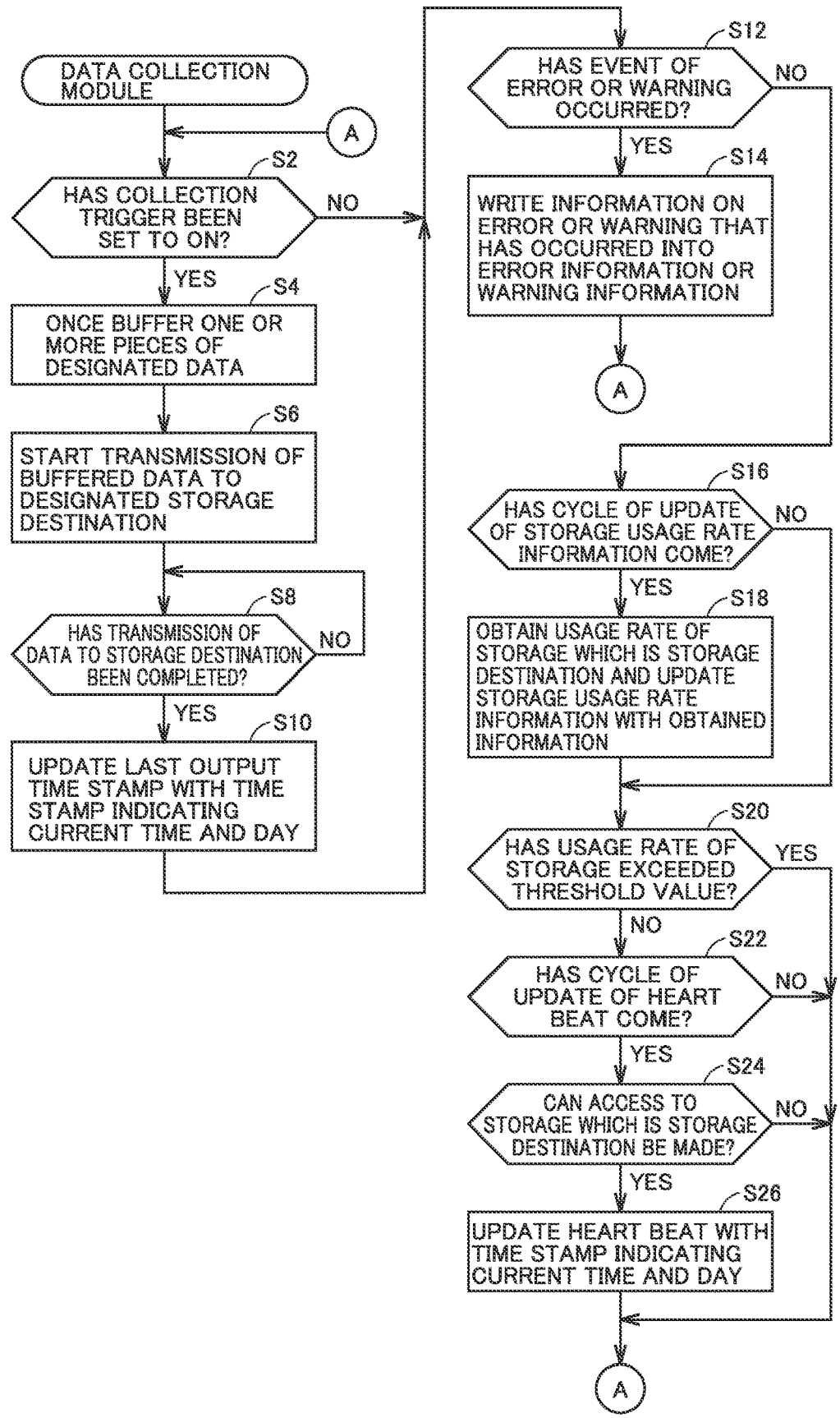
FIG. 7 is a flowchart showing a procedure of processing performed by a data collection module of the control device according to the present embodiment.

FIG. 7 is a flowchart showing a procedure of processing performed by data collection module 160 of control device 100 according to the present embodiment. Each step shown in FIG. 7 is typically performed by execution of system program 131 (FIG. 3) by processor 102 of control device 100.

Referring to FIG. 7, control device 100 determines whether or not the collection trigger has been set to ON (step S2). When the collection trigger has not been set to ON (NO in step S2), processing in steps S4 to S10 is skipped and processing in step S12 or later is repeated.

When the collection trigger has been set to ON (YES in step S2), control device 100 has one or more pieces of designated data once buffered (step S4). When buffering of one or more pieces of designated data has been completed, control device 100 starts transmission of the buffered data to a designated storage destination (step S6).

Control device 100 determines whether or not transmission of the data to the storage destination has been completed (step S8). When transmission of the data to the storage destination has not been completed (NO in step S8), processing in step S8 is repeated.

Control device 100 thus performs processing for collecting one or more pieces of data designated in advance and storing the data in the storage designated in advance (steps S4 to S8).

When transmission of the data to the storage destination has been completed (YES in step S8), control device 100 updates last output time stamp 1785 with the time stamp indicating the current time and day (step S10).

Control device 100 thus performs processing (steps S8 and S10) for writing into status monitoring data 178 (shared information), the information indicating completion of storage of data in the storage.

Control device 100 then determines whether or not an event of an error or a warning has occurred (step S12). When the event of the error or the warning has occurred (YES in step S12), control device 100 writes into error information 1782 or warning information 1783, information on the error or the warning that has occurred (step S14). Processing in step S2 or later is then repeated.

When the event of the error or the warning has not occurred (NO in step S12), control device 100 determines whether or not a cycle of update of storage usage rate information 1784 has come (step S16). When the cycle of update of storage usage rate information 1784 has come (YES in step S16), control device 100 obtains the usage rate of the storage which is the storage destination and updates storage usage rate information 1784 with the obtained information (step S18).

When the cycle of update of storage usage rate information 1784 has not yet come (NO in step S16), processing in step S18 is skipped.

Control device 100 then determines whether or not the obtained usage rate of the storage has exceeded a predetermined threshold value (step S20).

When the obtained usage rate of the storage has not exceeded the predetermined threshold value (NO in step S20), control device 100 determines whether or not the cycle of update of heart beat 1781 has come (step S22). When the cycle of update of heart beat 1781 has come (YES in step S22), control device 100 determines whether or not access to the storage which is the storage destination can be made (step S24). When access to the storage which is the storage destination can be made (YES in step S24), control device 100 updates heart beat 1781 with the time stamp indicating the current time and day (step S26). The processing in step S2 or later is then repeated.

When the obtained usage rate of the storage has exceeded the predetermined threshold value (YES in step S20), processing in steps S22 to S26 is skipped. When the cycle of update of heart beat 1781 has not yet come (NO in step S22), processing in steps S24 and S26 is skipped. When access to the storage which is the storage destination cannot be made (NO in step S24), processing in step S26 is skipped.

Data is collected and status monitoring data 178 is updated through the processing procedure as set forth above.

Figure 8:
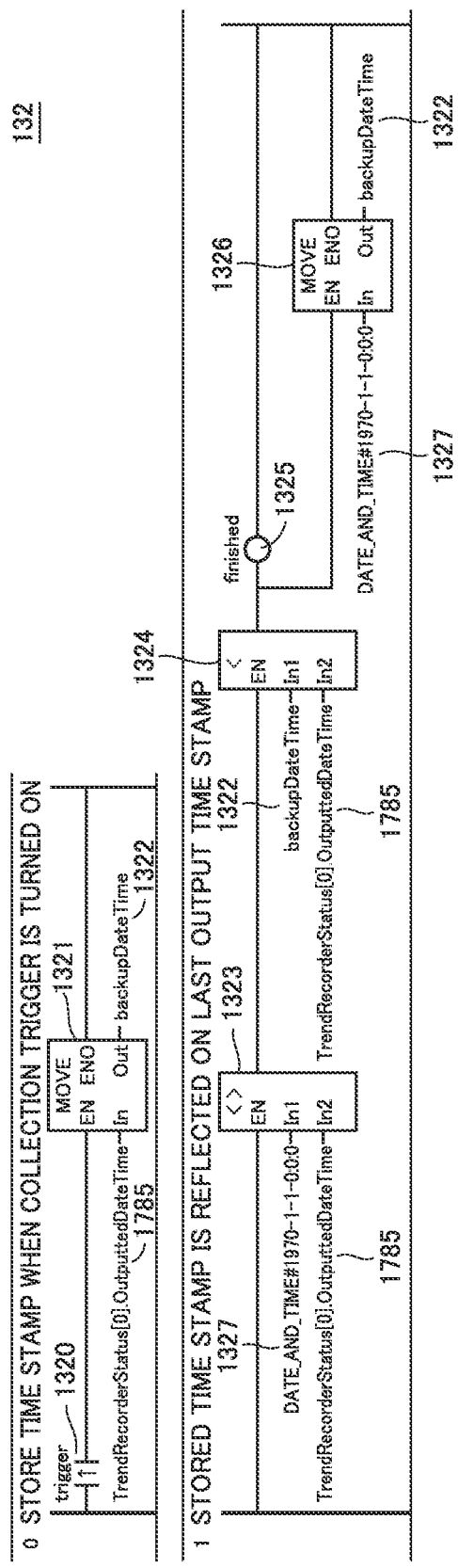
FIG. 8 is a diagram showing an exemplary user program executed in the control device according to the present embodiment.

FIG. 8 is a diagram showing exemplary user program 132 executed in control device 100 according to the present embodiment. FIG. 8 shows an exemplary code for checking completion of storage of collected data in the storage destination in PLC engine 150 (user program 132).

Referring to FIG. 8, a code in the first line of user program 132 indicates processing for storage of time and day (time stamp) of start of data collection by data collection module 160 in a variable 1322. More specifically, in a control cycle in which a collection trigger 1320 has changed from OFF to ON, a data write instruction 1321 is executed. Data write instruction 1321 has a value of last output time stamp 1785 written in variable 1322. In other words, the time stamp at the time of start of data collection is set in variable 1322.

A code in the second line of user program 132 indicates processing for determining whether or not a value of last output time stamp 1785 has changed. More specifically, a comparison instruction 1324 outputs ON (TRUE) when the value of last output time stamp 1785 is larger than the value of variable 1322 (the time stamp at the time when collection trigger 1320 has changed to ON).

A comparison instruction 1323 outputs ON (TRUE) when the value of a time stamp 1327 indicating reference time and day is different from the value of last output time stamp 1785. In other words, comparison instruction 1323 is a start-up condition for avoiding erroneous determination as a result of execution of comparison instruction 1324 in the second line in the control cycle the same as the control cycle in which data write instruction 1321 included in the code in the first line is executed.

When comparison instruction 1324 outputs ON (TRUE), a completion flag 1325 is set to ON (TRUE) and a data write instruction 1326 is executed. Data write instruction 1326 has a value of time stamp 1327 indicating the reference time and day written into variable 1322. In other words, the time stamp at the time of completion of storage of data is set in variable 1322.

The code of user program 132 as set forth above can be used to monitor update (change) of last output time stamp 1785 to thereby detect completion of storage of collected data in the storage.

Figure 9:
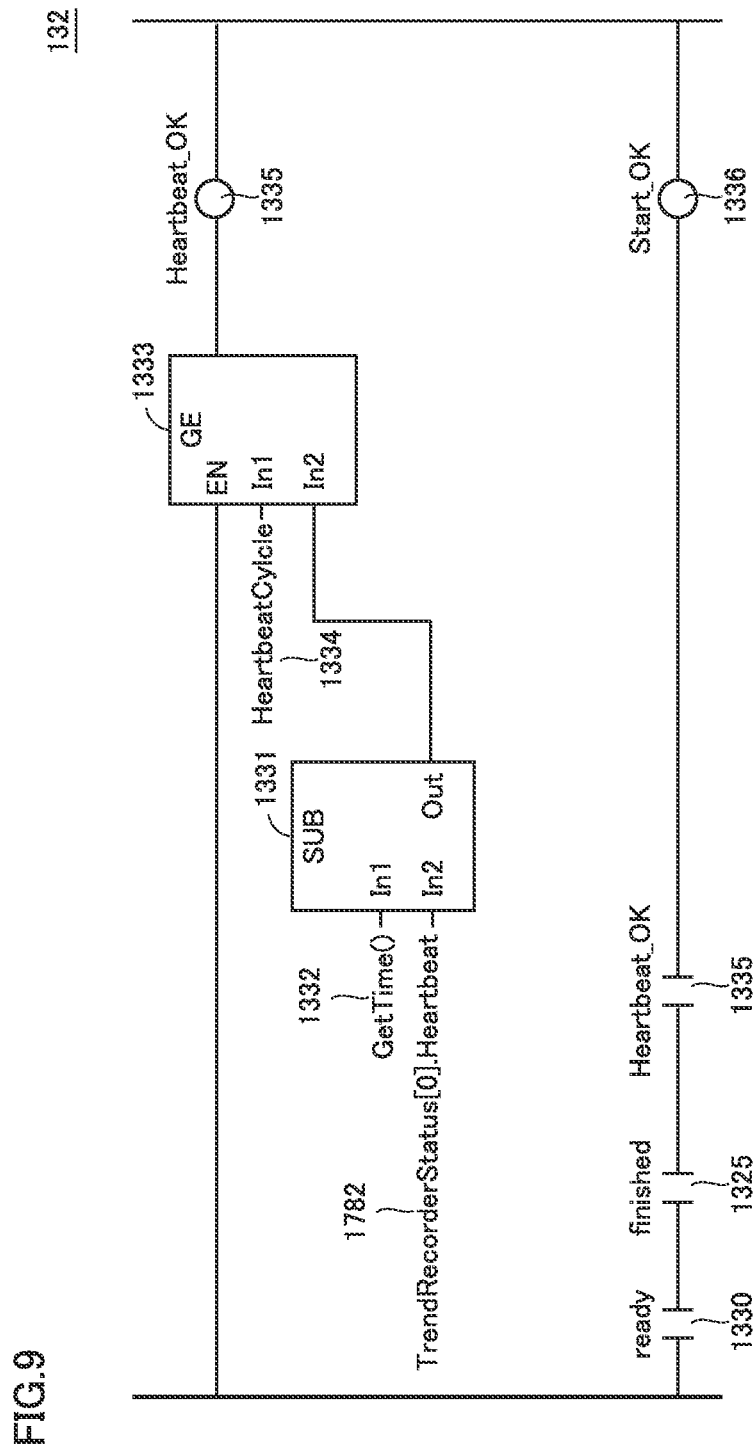
FIG. 9 is a diagram showing another exemplary user program executed in the control device according to the present embodiment.

FIG. 9 is a diagram showing another exemplary user program 132 executed in control device 100 according to the present embodiment. FIG. 9 shows an exemplary code for setting a condition for start of a cycle of the production process in PLC engine 150 (user program 132).

Referring to FIG. 9, user program 132 defines three conditions for starting the cycle of the production process. More specifically, a ready flag 1330 indicating completion of preparation for start of the production process, a completion flag 1325 indicating completion of storage of collected data performed previously, and a heart beat normality flag 1335 indicating normal update of heart beat 1781 are defined as the conditions. All of ready flag 1330, completion flag 1325, and heart beat normality flag 1335 being ON (TRUE) is set as the condition. When all conditions are satisfied, a production process preparation completion flag 1336 is set to ON (TRUE).

A temporal subtraction instruction 1331 calculates a difference between a value of a time stamp 1332 indicating the current time and day and a value of heart beat 1781. Comparison instruction 1333 sets heart beat normality flag 1335 to ON (TRUE) when the difference between the value of time stamp 1332 indicating the current time and day and the value of heart beat 1781 is equal to or less than a heart beat update cycle length 1334. In other words, when the time stamp in heart beat 1781 is updated within update cycle length 1334 from the current time point, determination as being ready for normal storage of collected data is made and determination as being ready for start of a next cycle is made.

By thus including heart beat 1781 in the condition for start of the cycle of the production process, such restriction that the next cycle of the production process does not start until collected data can normally be stored can be set. By adopting such a condition, such a situation as inappropriate start of the cycle of the production process in the case of (1) a network failure between control device 100 (or network camera 50) and the storage (server apparatus 200 and/or network storage 250), (2) a hardware failure of control device 100 (or network camera 50), (3) decrease in available space in the storage, or (4) erroneous setting of a collection condition can be avoided.

<F. Exemplary Processing>

Exemplary processing in data collection by control system 1 according to the present embodiment will now be described.

Figure 10A:
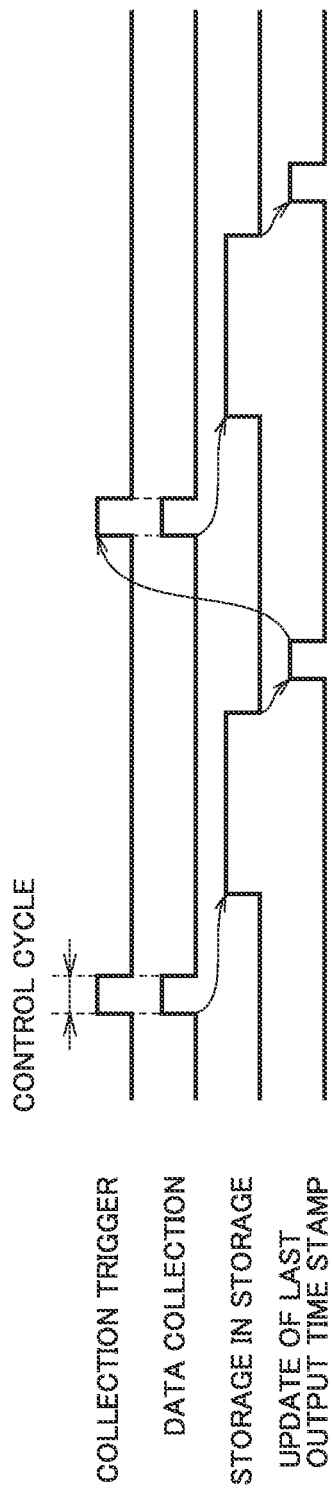
FIGS. 10A to 10C are time charts each showing exemplary processing for data collection by the control system according to the present embodiment.
Figure 10B:
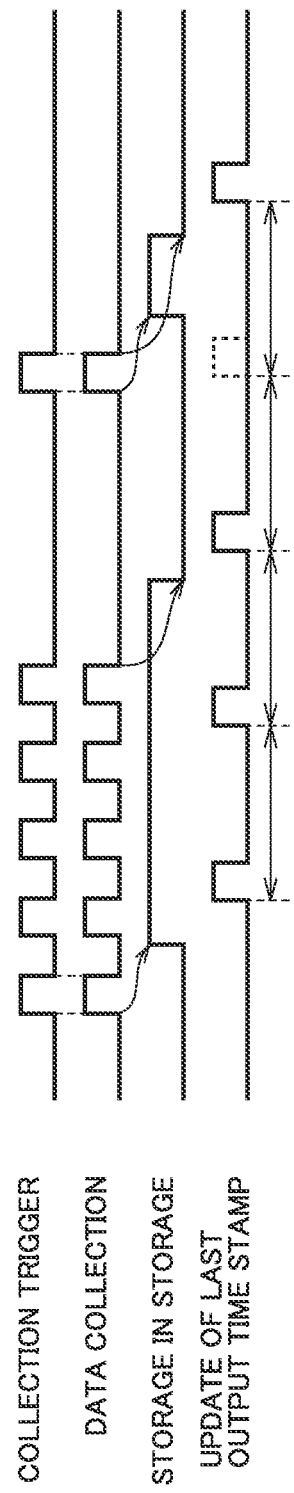
Figure 10C:
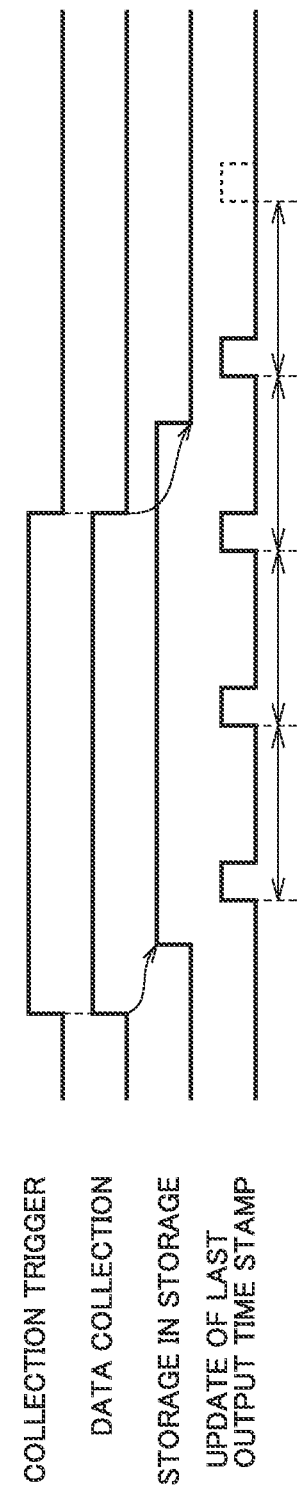

FIGS. 10A to 10C are time charts each showing an example of processing for data collection by control system 1 according to the present embodiment.

FIG. 10A shows exemplary processing in which the collection trigger is set to ON only for one control cycle. In this example, data is collected in coordination with the collection trigger. In response to rise (change from OFF to ON) of the collection trigger, storage in the storage is started with delay of a prescribed time period. When storage in the storage is completed, last output time stamp 1785 is updated. On condition that last output time stamp 1785 is updated, a next cycle is started.

FIG. 10B shows exemplary processing in which the collection trigger is set to ON a plurality of times. The data is collected in coordination with the collection trigger also in this example. Storage in the storage is done continuously in accordance with data that may successively be generated by data collection. In storage in the storage, each time storage of data in prescribed units (for example, in units of file) is successively completed, last output time stamp 1785 is also successively updated. Update per se of the value of last output time stamp 1785 may be done in constant cycles. In an example where the value of last output time stamp 1785 is updated in constant cycles, when storage in the storage has not been completed in a previous cycle or when storage in the storage has not been done in the previous cycle, last output time stamp 1785 is not updated.

FIG. 10C shows exemplary processing in which the collection trigger is maintained at ON over a plurality of control cycles. The data is collected in coordination with the collection trigger also in this example. Storage in the storage is done continuously in accordance with data that may successively be generated by data collection. In storage in the storage, each time storage of data in prescribed units (for example, in units of file) is successively completed, last output time stamp 1785 is also successively updated. Update per se of the value of last output time stamp 1785 may be done in constant cycles. In an example where the value of last output time stamp 1785 is updated in constant cycles, when storage in the storage has not been completed in a previous cycle or when storage in the storage has not been done in the previous cycle, last output time stamp 1785 is not updated.

As shown in FIGS. 10A to 10C, any data collection and control of the production process in accordance with an application or a purpose can be realized with the use of change in value of the collection trigger and last output time stamp 1785.

<G. Format in Storage of Data>

Data to be stored in the storage in storage of data described above may be stored in a format reduced in data amount as below. More specifically, data collection module 160 of control device 100 may compress buffered data in processing as below and then transmit the compressed data to the storage. A processing method for data compression which will be described below is suitable for information from a production site collected by control device 100.

FIGS. 11A and 10B are diagrams each showing an example of data compression by control system 1 according to the present embodiment. FIG. 11A shows exemplary collected data 180 yet to be compressed. Collected data 180 includes a plurality of records composed of a time stamp 181 indicating collection timing and collected data 182. Data 182 collected by control device 100 changes sporadically as compared with the collection cycle. Therefore, only a part of pieces of data aligned in a time-series manner, the value of which has changed, may be extracted, and outputted as collected data 180.

FIG. 11B shows exemplary collected data 190 obtained by compression of collected data 180. Collected data 190 includes time stamp 191 indicating collection timing, elapsed time 192, a change flag 193, a state of variable 194, and a storage area 195.

A time stamp indicating reference time and day is stored in time stamp 191 in a specific (normally top) record. Time elapsed since the reference time and day stored in time stamp 191 is stored in elapsed time 192.

A flag indicating whether or not data stored in storage area 195 in a corresponding record has changed from data stored in storage area 195 in an immediately preceding record is stored in presence-of-change flag 193. When there is change from the immediately preceding record, "1" (TRUE) is set, and when a record is the same as the immediately preceding record, "0" (FALSE) is set.

A bit string having a length corresponding to the number of bits which corresponds to the number of pieces of data stored in storage area 195 is stored in state of variable 194. A position of each bit is brought in correspondence with a position (a string number) of data stored in storage area 195. In the bit string stored in state of variable 194, "1" (TRUE) is set only for data that has changed from data in the immediately preceding record, and otherwise "0" (FALSE) is set.

For example, "100000" means that data in the first place (string) (corresponding to data1 in FIG. 11A) has changed and one corresponding value is stored in storage area 195. In addition, "010100" means that only data in the second place (string) and data in the fourth place (string) (corresponding to data2 and data4 in FIG. 11A) have changed and two corresponding values are stored in storage area 195.

Data set to "1" (TRUE) in the bit string in state of variable 194 is stored in storage area 195.

Collected data 190 thus includes only data that has changed from the data in the immediately preceding record based on comparison of records aligned in the time-series manner. In other words, data collection module 160 of control device 100 may cause information on a part of presently collected data to be stored in the storage, the part of the presently collected data being a part that has changed from the data collected immediately before.

By adopting such a data compression technique, time-series data, the value of which changes sporadically as compared with the collection cycle, can efficiently be collected.

FIGS. 12A and 12B are diagrams each showing another example of data compression by control system 1 according to the present embodiment. FIG. 12A shows exemplary collected data 180 that has not been compressed. In collected data 180 shown in FIG. 12A, a value of data 182 has not changed even after lapse of time. Such collected data 180 has not changed from data in the immediately preceding record (that is, a value the same as that of data 182 in the immediately preceding record is stored as data 182). Therefore, the fact that the value of data 182 is the same should only be included as information in collected data 180.

FIG. 12B shows exemplary collected data 190A obtained by compression of collected data 180. Collected data 190A further includes the number of times of repetition 196 as compared with collected data 190 shown in FIG. 11B.

The number of times of repetition 196 indicates in how many records data the same as data stored in a corresponding record is repeated. In collected data 190A shown in FIG. 12B, "8" is stored in the number of times of repetition 196, which indicates that eight records including data the same as that in the first record further follow. In other words, when collected data is identical in a plurality of times of data collection, data collection module 160 of control device 100 may cause contents of identical data and the number of times of repeated collection of the identical data to be stored in the storage.

Thus, when the same records aligned in the time-series manner are successive, collected data 190A includes only the number of successive records (the number of times of repetition) so that time-series data can efficiently be collected.

<H. Additional Aspects>

The present embodiment as described above encompasses technical concepts as below.

[Configuration 1]

A control device includes a control operation performing unit (150) configured to perform control operation on a control target in accordance with a user program (132), a data collector (160) configured to collect one or more pieces of data designated in advance and have the data stored in a storage (200, 250) designated in advance, and a data manager (170) configured to manage shared information (178) that can be accessed by the control operation performing unit and the data collector. The data collector is configured to write into the shared information, information (1785) indicating completion of storage of data in the storage. In the user program executed by the control operation performing unit, the shared information can be referred to.

[Configuration 2]

In the control device described in Configuration 1, the information indicating completion of storage of the data in the storage includes information indicating time and day of completion of storage of the data in the storage.

[Configuration 3]

In the control device described in Configuration 1 or 2, the control operation performing unit sets a collection trigger (1320) to ON when a condition designated in advance is satisfied, and the data collector starts data collection when the collection trigger is set to ON.

[Configuration 4]

In the control device described in any one of Configurations 1 to 3, the storage is connected to the control device over a network.

[Configuration 5]

In the control device described in any one of Configurations 1 to 4, the data collector is configured to write into the shared information (1781), information indicating whether or not data can be stored in the storage.

[Configuration 6]

In the control device described in any one of Configurations 1 to 4, the shared information includes information (1784) on a usage rate of the storage.

[Configuration 7]

In the control device described in any one of Configurations 1 to 6, the data collector is configured to cause information (190) on a part of presently collected data to be stored in the storage, the part of the presently collected data being a part that has changed from data collected immediately before.

[Configuration 8]

In the control device described in any one of Configurations 1 to 7, when collected data is identical in a plurality of times of data collection, the data collector causes contents of identical data and the number of times (190A) of repeated collection of the identical data to be stored in the storage.

[Configuration 9]

A system program (131) causes a computer (100) to perform performing control operation on a control target in accordance with a user program (132) (S150), collecting one or more pieces of data designated in advance and storing the data in a storage (200, 250) designated in advance (S4 to S8), and writing into shared information (178), information (1785) indicating completion of storage of data in the storage (S10). In the user program, the shared information can be referred to.

[Configuration 10]

A method performed by a control device includes performing control operation on a control target in accordance with a user program, collecting one or more pieces of data designated in advance and storing the data in a storage (200, 250) designated in advance (S4 to S8), and writing into shared information (178), information (1785) indicating completion of storage of data in the storage (S10). In the user program, the shared information can be referred to.

<I. Advantage>

The control system including the control device according to the present embodiment can provide solving means for more reliable collection of data.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 control system; 2 local network; 4 global network; 6 field network; 10 field apparatus group; 12 remote I/O apparatus; 14 relay group; 16 servo driver; 18 servo motor; 50 network camera; 100 control device; 102 processor; 104 chip set; 106 main storage; 108 secondary storage; 110 network controller; 112 USB controller; 114 memory card interface; 116 memory card; 118 field network controller; 122 internal bus controller; 124 I/O unit; 131 system program; 132 user program; 133 data collection setting; 150 PLC engine; 160 data collection module; 170 data manager; 172 input data; 174 output data; 176 internal data; 178 status monitoring data; 180, 190, 190A collected data; 181, 1327, 1332 time stamp; 182 data; 192 elapsed time; 193 change flag; 194 state of variable; 195 storage area; 196 the number of times of repetition; 200 server apparatus; 250 network storage; 300 support apparatus; 1320 collection trigger; 1321, 1326 data write instruction; 1322 variable; 1323, 1324, 1333 comparison instruction; 1325 completion flag; 1330 ready flag; 1331 temporal subtraction instruction; 1334 update cycle length; 1335 heart beat normality flag; 1336 preparation completion flag; 1781 heart beat; 1782 error information; 1783 warning information; 1784 storage usage rate information; 1785 last output time stamp

The invention claimed is:

1. A control device comprising one or more memories storing a user program and at least one processor configured to access the one or more memories and execute the user program to implement:
  a programmable logic controller (PLC) engine configured to perform control operation on a control target;
  a data collector configured to receive one or more pieces of data designated in advance from a field apparatus group in a manufacturing apparatus and/or a production line over a field network and have the data stored in a storage designated in advance; and
  a data manager configured to manage shared information that can be accessed by the PLC engine and the data collector,
  wherein:
  the data collector is configured to write into the shared information, information indicating whether data can be stored in the storage and information indicating completion of storage of data in the storage, and the user program executed by the PLC engine refers to the shared information to perform the control operation on the control target in the manufacturing apparatus and/or the production line.

2. The control device according to claim 1, wherein the information indicating completion of storage of the data in the storage includes information indicating time and day of completion of storage of the data in the storage.

3. The control device according to claim 1, wherein the PLC engine sets a collection trigger to ON when a condition designated in advance is satisfied, and the data collector starts data collection when the collection trigger is set to ON.

4. The control device according to claim 1, wherein the storage is connected to the control device over a local network.

5. The control device according to claim 1, wherein the shared information includes information on a usage rate of the storage.

6. The control device according to claim 1, wherein the data collector is configured to cause information on a part of presently collected data to be stored in the storage, the part of the presently collected data being a part that has changed from data collected immediately before.

7. The control device according to claim 1, wherein when collected data is identical in a plurality of times of data collection, the data collector causes contents of identical data and the number of times of repeated collection of the identical data to be stored in the storage.

8. The control device according to claim 1, wherein the user program executed by the PLC engine controls a start of a next processing in the manufacturing apparatus and/or the production line based on the shared information indicating the completion of the storage of the data in the storage.

9. A non-transitory computer-readable medium storing a system program thereon, the system program, when executed by one or more processors, causing the one or more processors to perform:
performing control operation on a control target in accordance with a user program executed by a programmable logic controller (PLC) engine;
receiving one or more pieces of data designated in advance from a field apparatus group in a manufacturing apparatus and/or a production line over a field network and storing the data in a storage designated in advance; and
writing into shared information, information indicating whether data can be stored in the storage and information indicating completion of storage of data in the storage,
wherein
the user program executed by the PLC engine refers to the shared information to perform the control operation on the control target in the manufacturing apparatus and/or the production line.

10. The non-transitory computer-readable medium according to claim 9, wherein
the information indicating completion of storage of the data in the storage includes information indicating time and day of completion of storage of the data in the storage.

11. The non-transitory computer-readable medium according to claim 9, wherein the system program further causes the one or more processors to perform:
setting a collection trigger to ON when a condition designated in advance is satisfied, and
starting data collection when the collection trigger is set to ON.

12. The non-transitory computer-readable medium according to claim 9, wherein
the storage is connected to the control device over a local network.

13. The non-transitory computer-readable medium according to claim 9, wherein
the shared information includes information on a usage rate of the storage.

14. The non-transitory computer-readable medium according to claim 9, wherein the user program executed by the PLC engine controls a start of a next processing in the manufacturing apparatus and/or the production line based on the shared information indicating the completion of the storage of the data in the storage.

15. A method performed by a control device, the method comprising:
performing a control operation on a control target in accordance with a user program executed by a programmable logic controller (PLC) engine;
receiving one or more pieces of data designated in advance from a field apparatus group in a manufacturing apparatus and/or a production line over a field network and storing the data in a storage designated in advance; and
writing into shared information, information indicating whether data can be stored in the storage and information indicating completion of storage of data in the storage,
wherein
the user program executed by the PLC engine refers to the shared information to perform the control operation on the control target in the manufacturing apparatus and/or the production line.

16. The method according to claim 15, wherein
the information indicating completion of storage of the data in the storage includes information indicating time and day of completion of storage of the data in the storage.

17. The method according to claim 15, further comprising:
setting a collection trigger to ON when a condition designated in advance is satisfied, and
starting data collection when the collection trigger is set to ON.

18. The method according to claim 15, wherein
the storage is connected to the control device over a local network.

19. The method according to claim 15, wherein
the shared information includes information on a usage rate of the storage.

20. The method according to claim 15, wherein the user program executed by the PLC engine controls a start of a next processing in the manufacturing apparatus and/or the production line based on the shared information indicating the completion of the storage of the data in the storage.

* * * * *